United States Patent
Ngai et al.

(10) Patent No.: US 12,367,647 B2
(45) Date of Patent: Jul. 22, 2025

(54) APPARATUS AND METHOD FOR ALIGNING VIRTUAL OBJECTS IN AUGMENTED REALITY VIEWING ENVIRONMENT

(71) Applicant: Hong Kong Applied Science and Technology Research Institute Company Limited, Hong Kong (HK)

(72) Inventors: Yat Cheung Ngai, Hong Kong (HK); Yin Yee Chan, Hong Kong (HK)

(73) Assignee: Hong Kong Applied Science and Technology Research Institute Company Limited, Hong Kong (HK)

(*) Notice: Subject to any disclaimer, the term of this patent is extended or adjusted under 35 U.S.C. 154(b) by 267 days.

(21) Appl. No.: 18/302,805

(22) Filed: Apr. 19, 2023

(65) Prior Publication Data

US 2024/0355062 A1 Oct. 24, 2024

(51) Int. Cl.
| | |
|---|---|
| G06T 19/00 | (2011.01) |
| G06T 19/20 | (2011.01) |
| G06V 10/74 | (2022.01) |
| G06V 10/82 | (2022.01) |

(52) U.S. Cl.
CPC ............ *G06T 19/006* (2013.01); *G06T 19/20* (2013.01); *G06V 10/761* (2022.01); *G06V 10/82* (2022.01); *G06T 2219/2004* (2013.01); *G06V 2201/07* (2022.01)

(58) Field of Classification Search
CPC ................ G06T 19/006; G06T 19/20; G06T 2219/2004; G06V 10/761; G06V 10/82
USPC ........................................................ 345/633
See application file for complete search history.

(56) References Cited

U.S. PATENT DOCUMENTS

| | | | |
|---|---|---|---|
| 9,928,655 B1 | 3/2018 | Alston | |
| 10,885,712 B2 | 1/2021 | Elangovan et al. | |
| 11,169,832 B1 | 11/2021 | Ngai et al. | |
| 11,232,644 B1 | 1/2022 | Lee | |
| 2017/0367766 A1* | 12/2017 | Mahfouz | ............... A61F 2/3859 |

(Continued)

FOREIGN PATENT DOCUMENTS

| | | |
|---|---|---|
| CN | 109920064 A | 6/2019 |
| CN | 107025662 B | 6/2020 |

OTHER PUBLICATIONS

International Search Report and Written Opinion of corresponding PCT application No. PCT/CN2023/096373 mailed on Dec. 21, 2023.

*Primary Examiner* — Thomas J Lett
(74) *Attorney, Agent, or Firm* — Idea Intellectual Limited; Sam T. Yip

(57) ABSTRACT

A method of aligning and overlaying an AR virtual object in an electronic 3D viewing environment, comprising: receiving a motion comprising: a surrounding real-world scene image containing the real-world object captured by a camera of the electronic 3D viewing environment, and a camera real-world pose; recognizing a reference feature for aligning the virtual object to the real-world object; recording the motion and its corresponding reference feature; estimating a real-world object pose using the camera real-world pose and the reference feature; refining the estimated real-world object pose by pose estimation refinement by features and pose estimation refinement by images; and rendering the virtual object according to the estimated and refined real-world object pose in the 3D viewing environment.

18 Claims, 6 Drawing Sheets

(56) References Cited

U.S. PATENT DOCUMENTS

| | | |
|---|---|---|
| 2019/0019335 A1* | 1/2019 | Elangovan ............ G06T 19/006 |
| 2019/0082118 A1 | 3/2019 | Wang et al. |
| 2019/0096135 A1* | 3/2019 | Dal Mutto ........ G06F 18/24765 |
| 2019/0192233 A1 | 6/2019 | O' Grady et al. |
| 2020/0082626 A1 | 3/2020 | Guo |
| 2020/0234498 A1 | 7/2020 | Price et al. |
| 2021/0125412 A1 | 4/2021 | Paulus, Jr. et al. |
| 2022/0189060 A1 | 6/2022 | Törkoglu et al. |
| 2023/0008125 A1 | 1/2023 | Hellge et al. |

* cited by examiner

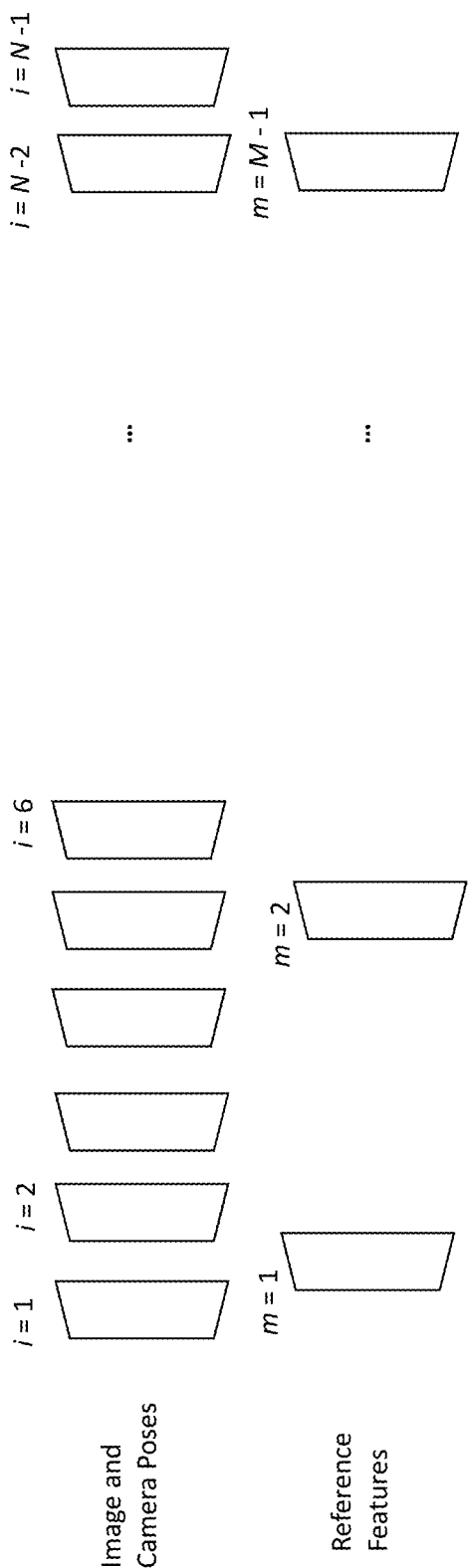

APPARATUS AND METHOD FOR ALIGNING VIRTUAL OBJECTS IN AUGMENTED REALITY VIEWING ENVIRONMENT

FIELD OF THE INVENTION

The present invention relates generally to methods and systems for electronic three-dimensional (3D) viewing environment (i.e., augmented reality glasses and goggles) user-interactions and the use of electronic 3D viewing environments for augmented reality applications.

BACKGROUND OF THE INVENTION

In many commercial and industrial onsite work scenario, for example installation, maintenance, and troubleshooting of telecommunication and utility equipment, field technicians relied on paper instructions or mobile computing devices like smartphones and laptops displaying online instructions. This typically cumbersome needing to juggle multiple articles in hands while performing the work, not to mention the added difficulty of having to collaborate with other personnel and subject matter experts located afar. The introduction of the augmented reality (AR) viewing devices (i.e., AR glasses, smartphones and tablet computers configured for AR applications) in their fieldwork, real-time intelligence, troubleshooting log, graphics and encrypted data from back-end systems can be streamed and made accessible onsite to the field technicians anytime and anywhere, improving operation speed and quality significantly.

AR user manual takes online user guide to the next level by overlaying texts, images, videos, and/or 3D models with AR technology on objects in the user's viewing scenes, providing instructions to the user in an interactive manner. It is suitable for anyone who can benefit from step-by-step instructions or demonstrations in an interactive manner and it can be used across many different industries and application situations. More specifically, AR user manuals are supported by computer visualization technologies, which superimpose computer-generated images on the users' views of the real-world scenes, offering them mixed virtual-reality viewing experiences allowing better understanding of the instructions and demonstrations.

Besides AR user manuals, there are many more other applications. For example, without limitation, overlaying onto a target real-world object a virtual object that has a similar shape and outlook, but with altered or additional artifacts such as a caption or texts, a sign or a logo can be useful in electronic game amusement, entertainment, training simulation, education, and other commercial and industrial applications.

Currently, there are two main approaches to AR user manual generation: marker-based approach and artificial intelligence (AI)-based approach. Under the marker-based approach, the target real-world object on which a virtual object is to be superimposed upon is first marked with visual markers. The user using a pair of AR glasses first views the target real-world object in the live surrounding real-world scene, allowing the AR glasses to capture an image of the target real-world object and scan the markers for object pose estimation. As the user and/or the target real-world object move around in relative to each other, real-time images as viewed through the AR glasses and motion sensors data are captured continuously for simultaneous localization and mapping (SLAM) processing and camera pose tracking. With the estimated object pose and the tracked camera pose, the virtual object is rendered (overlaid), positioned according to the markers, onto the target real-world object in the live surrounding real-world scene displayed by the AR glasses. The short-coming of this approach obviously is the need of first placing markers on the target real-world object, which is impractical in many situations.

Under the AI-based approach, a deep learning system, such as one of readily available neural networks, is used to provide the object pose estimation of the target real-world object in the live scene from an image of the target object in the live scene as viewed through the AR glasses by the user. The deep learning system is first trained with a training data set comprising images of objects of the same type as that of the target real-world object with annotation. As the user and/or the target real-world object move around in relative to each other, real-time images of the surrounding scene as viewed through the AR glasses and motion sensors data are captured continuously for SLAM processing and camera pose tracking. With the AI-estimated object pose and the tracked camera pose, the virtual object is rendered (overlaid) onto the target real-world object in the live-view displayed by the AR glasses. Typically, such AI-based approaches are computationally intensive; also, the accuracy depends largely on the amount and relevancy of the training data in training the deep learning system. Depending on the types of target real-world objects, the cost or effort of acquiring such training data may be very, if not impractically, high.

SUMMARY OF THE INVENTION

In addressing the aforesaid challenges in the current state of the art, the present invention provides an apparatus and a method of aligning and overlaying a virtual object onto a real-world object in an electronic 3D viewing environment without the need for pre-set markers and the training for AI-based systems.

In accordance to one embodiment of the present invention, a method for aligning and overlaying a virtual object onto a real-world object in an electronic three-dimensional (3D) viewing environment is provided. The method starts by receiving a stream of live motions with each motion there within comprising an image of a surrounding real-world scene containing the real-world object captured by a camera of the electronic 3D viewing environment, and a camera real-world pose.

The method then proceeds to recognizing a reference feature for aligning the virtual object to the real-world object, wherein the reference feature comprises a real-world location coordinate of a real-world landmark on the real-world object in the image, and a virtual location coordinate of a corresponding virtual landmark on the virtual object.

The method further comprises recording the motion if the motion changes from a last recorded motion; and recording the reference feature if the reference feature changes from a last recorded reference feature.

The method further comprises estimating a real-world object pose using deep neural network (DNN)-based image segmentation in segmenting the captured image of the surrounding real-world scene containing the real-world object followed by inference of a relative real-world object orientation relative the camera real-world orientation by DNN-based pose estimation. The real-world object pose is then estimated from vector computation using the camera real-world pose, the relative real-world object orientation, and the reference feature. The real-world object pose estimation is then further refined by a real-world object pose estimation refinement by images process using selected number of recorded motions.

For each of subsequent motions in the stream of live motions, the real-world object pose estimation is refined only by a real-world object pose estimation refinement by features process using selected number of recorded features until a multi-outline-view of the arranged virtual object (arranged according to the estimated and refined real-world object pose) no longer matches a multi-outline-view of the real-world object, the real-world object pose is then re-estimated by executing the real-world object pose estimation process and real-world object pose estimation refinement by images process.

Lastly, the virtual object is rendered according to the estimated and refined real-world object pose in the 3D viewing environment overlaying the virtual object onto the real-world object in images of the surrounding real-world scene as captured by the camera.

BRIEF DESCRIPTION OF THE DRAWINGS

Embodiments of the invention are described in more detail hereinafter with reference to the drawings, in which:

FIG. 5 depicts an illustration of a real-world object pose estimation refinement by feature process in accordance to one embodiment of the present invention.

DETAILED DESCRIPTION

In the following description, apparatuses and methods for aligning and overlaying a virtual object onto a real-world object in an electronic 3D viewing environment, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance to one aspect of the present invention, provided is an apparatus of electronic 3D viewing environment configured for aligning and overlaying a virtual object onto a real-world object in the electronic 3D viewing environment. Without limitation, the virtual object may have a similar shape and outlook as a real-world object that it is to be overlaid upon, but with altered or additional artifacts such as a caption or texts of i.e., user manuals or notices, a sign, or a logo. Thus, the electronic 3D viewing environment allows its user to view her surrounding real-world scene with 3D argumentations displayed or projected (superimposed into the surrounding real-world scene) simultaneously an augmented reality.

Figure 1:
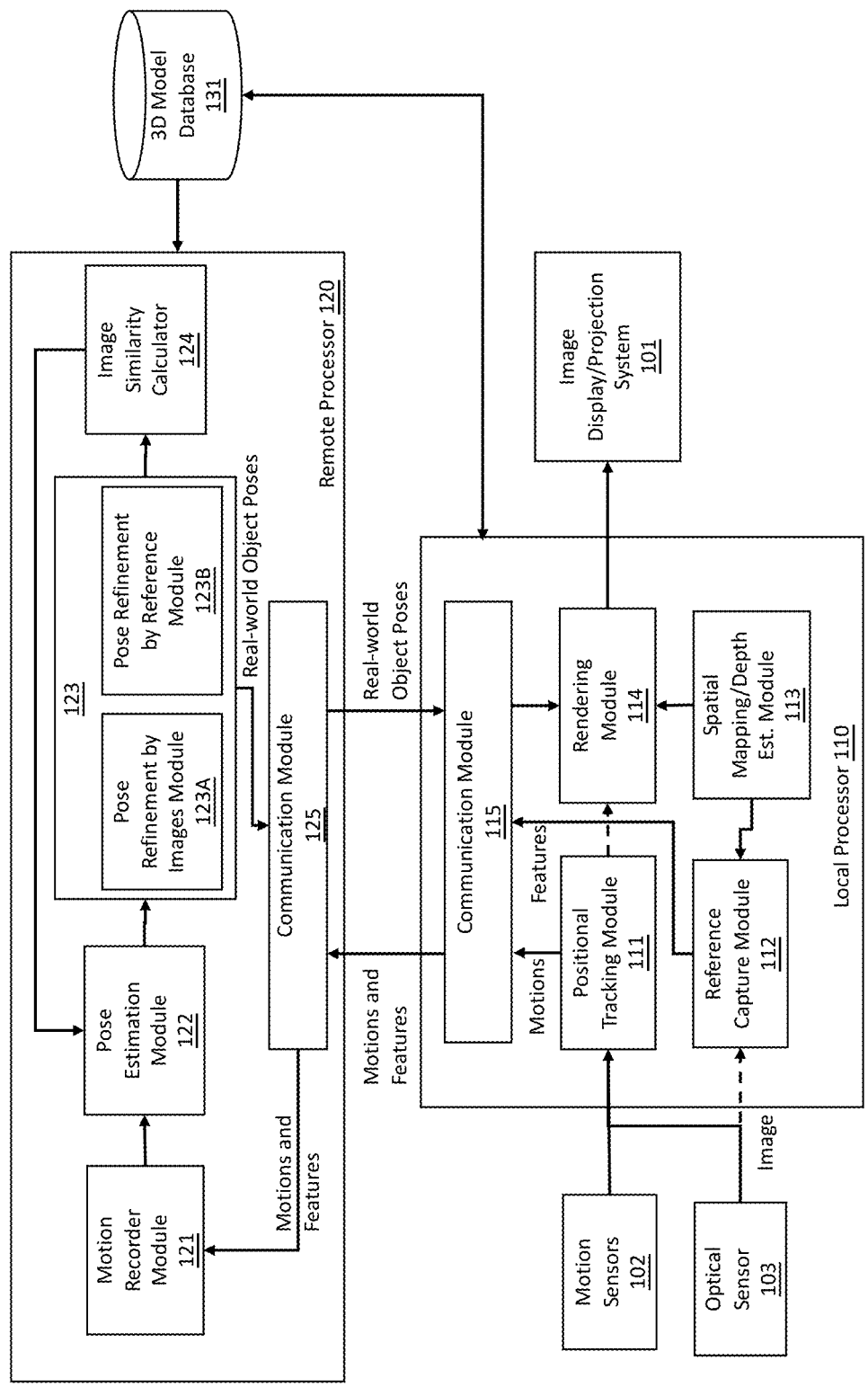
FIG. 1 depicts a schematic diagram illustrating the logical modules and components of an electronic 3D viewing environment in accordance to one embodiment of the present invention.

Referring to FIG. 1 in the following description. In various embodiments, the apparatus of electronic 3D viewing environment 100 comprises at least an image display or projection system 101 for displaying or projecting argumentation images for viewing by the user, an inside-out optical sensor (or camera) 103 for capturing images of the surrounding real-world scene, one or more motion sensors 102 for tracking the location and orientation (camera pose) of the inside-out optical sensor 103. In run-time, as the electronic 3D viewing environment is being used by a user, a stream of live motions, each comprising a captured image of the surrounding real-world scene and a camera pose, is generated. The stream of live motions is then augmented with virtual objects superimposed onto real-world objects shown in the images as captured under the corresponding camera poses for rendering an augmented 31) viewing environment.

The apparatus 100 further comprises a plurality of logical execution modules including a position and orientation tracking module 111 for computing a real-world location coordinate and a real-world orientation of the optical sensor 103 using signal data received from one or more motion sensors 102 of the electronic 3D viewing environment. The signal data may be, without limitation, Global Positional System (GPS) signal data, wireless triangulation of wireless communication signals, data from sensor fusion algorithms of the optical sensor 103 and the motion sensors 102, or visual-inertial odometry signal data.

The execution modules further include a reference feature capture module 112 for recognizing a real-world landmark of a reference feature in a captured image of the surrounding real-world scene. The real-world landmark can be any visual marker (i.e., a barcode or a QR code) shown on the real-world object in the captured image. Thus, the reference feature capture module 112 may employ a machine learning (ML) based object detector and/or a code scanner in detecting and/or scanning for the real-world landmark. The reference feature capture module 112 may also employ a user interface allowing the user to manually indicate the real-world landmark in the image being displayed to the user. After detecting the real-world landmark in the image, the reference feature capture module 112 determines its image location coordinate in the image. In addition, the reference feature capture module 112 receives from a 3D model database 131 the virtual object corresponding to the real-world object, and a virtual location coordinate of the corresponding virtual landmark on the virtual object.

The execution modules further include a spatial mapping or depth estimation module 113 for estimating the real-world location coordinate (depth) of a detected real-world landmark from its image location coordinate; and a rendering module 114 for rendering augmented images with virtual objects superimposed onto real-world objects to be displayed by the image display or projection system 101, or rendering projection images of virtual objects superimposed onto real-world objects to be projected by the image display or projection system 101 onto an optical combiner (i.e., a waveguide).

The execution modules further include a motion recorder module 121, a pose estimation module 122, pose refinement modules 123, and an image similarity calculator 124. The motion recorder module 121 is for recording one or more of the motions generated during run-time for use in the estimation and estimation refinement of the real-world object poses of the real-world objects shown in the images of the motions. The pose estimation module 122 is for estimating the real-world object poses of the real-world objects shown in the images. The pose refinement modules 123 are for refining the estimation of the real-world object poses of the real-world objects shown in the images. The pose refinement modules 123 comprise a pose refinement by images module 123A and a pose refinement by features module 123B. The image similarity calculator 124 is for executing a multi-outline-view matching of an arranged virtual object and the real-world object so to determine whether a re-estimation of the real-world object pose is needed.

In one embodiment, the position and orientation tracking module 111, the reference feature capture module 112, the spatial mapping or depth estimation module 113, and the rendering module 114 are executed by a configured local processor 110, which is electrically connected to the image display or projection system 101, the motion sensors 102, and the optical sensor 103; the motion recorder module 121, the pose estimation module 122, the pose refinement modules 123, and the image similarity calculator 124 are executed by a configured remote processor 120. Without limitation, the local processor 110 under this embodiment may be implemented by a low-powered processor residing within wearable computing device, such as a pair of AR glasses or goggles of the electronic 3D viewing environment, to be worn by a user during run-time; and the remote processor 120 a higher processing capability and capacity processor residing in a separate server computing device or mobile computing device. Under this embodiment, wired or wireless data communications between the local processor 110 and remote processor 120 are facilitated a communication module 115 executed by the local processor 110 and a corresponding communication module 125 executed by the remote processor 120.

In an alternative embodiment, all of the execution modules are executed by the same processor, which has sufficient computing capability and capacity. Under such embodiment, the communication modules 115 and 125 are omitted.

Figure 2:
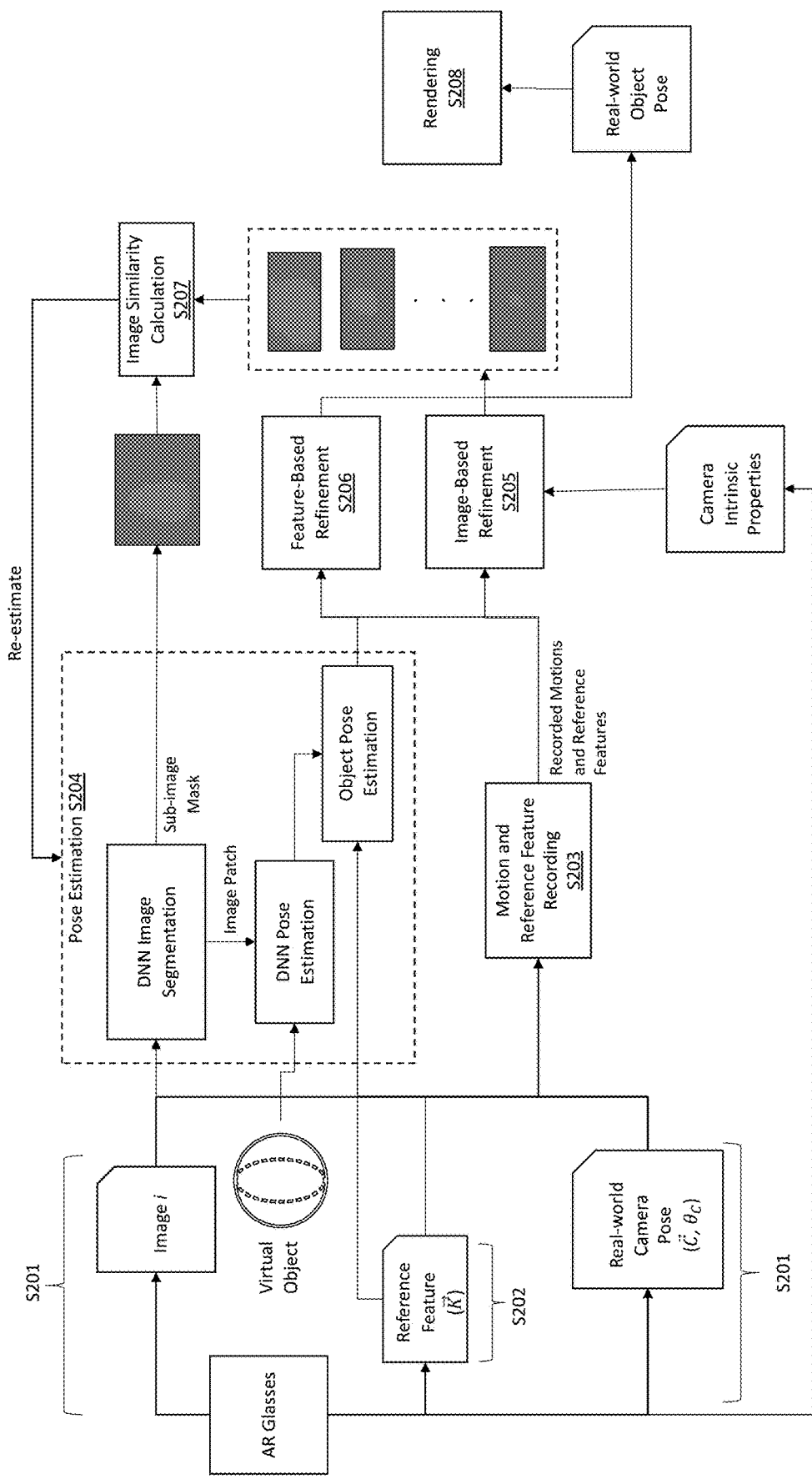
FIG. 2 depicts a schematic diagram illustrating the method process flow of the electronic 3D viewing environment in accordance to one embodiment of the present invention.

Referring to FIG. 2 for the following description. In accordance to another aspect of the present invention, provided is a method for aligning and overlaying a virtual object onto a real-world object in the electronic 3D viewing environment. In accordance to one embodiment, the method starts by (S201) receiving, by the local processor 110, a motion in a stream of a plurality of motions during run-time. The motion comprises an image of the surrounding real-world scene containing the real-world object captured by the optical sensor 103; and a camera real-world pose. The camera real-world pose comprises a camera real-world location coordinate of the optical sensor 103 and a camera real-world orientation of the lens of the optical sensor 103 determined by the position and orientation tracking module 111.

The method then proceeds to (S202) recognizing, by the reference feature capture module 112, a reference feature on the real-world object for aligning the virtual object to the real-world object. The reference feature comprises a real-world location coordinate of a real-world landmark on the real-world object in the image; and a virtual location coordinate of a corresponding virtual landmark on the virtual object.

In the embodiment where the motion recorder module 121, the pose estimation module 122, and the pose refinement modules 123 are executed by the remote processor 120 separate from the local processor 110 that executes the other execution modules, the motion and the feature are transmitted to the remote processor 120 for further processing by the motion recorder module 121, the pose estimation module 122, and the pose refinement modules 123.

The method further comprises: (S203) recording, by the motion recorder module 121, the motion if the camera pose changes from a last recorded camera pose; and the reference feature if the reference feature changes from a last recorded reference feature. More specifically, if the motion contains a camera real-world location coordinate that deviates from a camera real-world location coordinate of a last recorded motion beyond a maximum camera location coordinate change threshold ($Th_l$), or if the motion contains a camera real-world orientation that deviates from a camera real-world orientation of the last recorded motion beyond a maximum camera orientation change threshold ($Th_o$), then the motion is considered to have changed. And for the reference feature recording, if either the real-world location coordinate of the real-world landmark or the virtual location coordinate of the corresponding virtual landmark changes from that of the last recorded reference feature, then the reference feature is considered to have changed.

The method further comprises: (S204) estimating, by the pose estimation module 122, a real-world object pose, wherein the real-world object pose comprises a real-world location coordinate of the real-world object of the motion and a real-world orientation of the real-world object of the motion.

Following the real-world object pose estimation (S204), the real-world object pose estimation is refined by a real-world object pose estimation refinement images (S205) executed by the pose refinement by images module 123A, and then refined by a real-world object pose estimation refinement by feature (S206) executed by the pose refinement by features module 123B.

After the real-world object pose estimation (S204) and the real-world object pose estimation refinement by images (S205), the estimated and refined real-world object pose is used by the rendering module 114 in arranging and rendering the virtual object in the 3D viewing environment (S208).

For each of the subsequent motions in the stream of live motions, the real-world object pose estimation is refined only by the pose refinement by features module 123B (S206); and the real-world object pose estimation (S204) and the real-world object pose estimation refinement by images (S205) are not executed until the image similarity calculator 124 determines that a multi-outline-view of the virtual object arranged according to the estimated and refined real-world object pose is no longer matching a multi-outline-view of the real-world object.

In the multi-outline-view matching of an arranged virtual object and the real-world object (S207) executed by the image similarity calculator 124, a virtual-object two-dimensional (2D) outline is first generated of the virtual object arranged according to the real-world object pose estimated and refined for each of one or more selected recorded motions selected from the recorded motions. The selection of recorded motions comprises: obtaining an anchor recorded motion, which is the one that the real-world object pose estimation (S204) and the real-world object pose estimation refinement by images (S205) processes was last executed with: sorting the recorded motions by the magnitude of difference from the anchor recorded motion; and selecting S−1 recorded motions that are most different from the anchor recorded motion as the selected recorded motions.

Then, a real-world-object 2D outline is recognized of the real-world object in the image in each of the selected motions. The image similarity calculator 124 overlays each of the first 2D outlines on top of its corresponding real-world-object 2D outline of each of the selected recorded motions for matching the virtual-object 2D outlines with the real-world-object 2D outlines.

Figure 3:
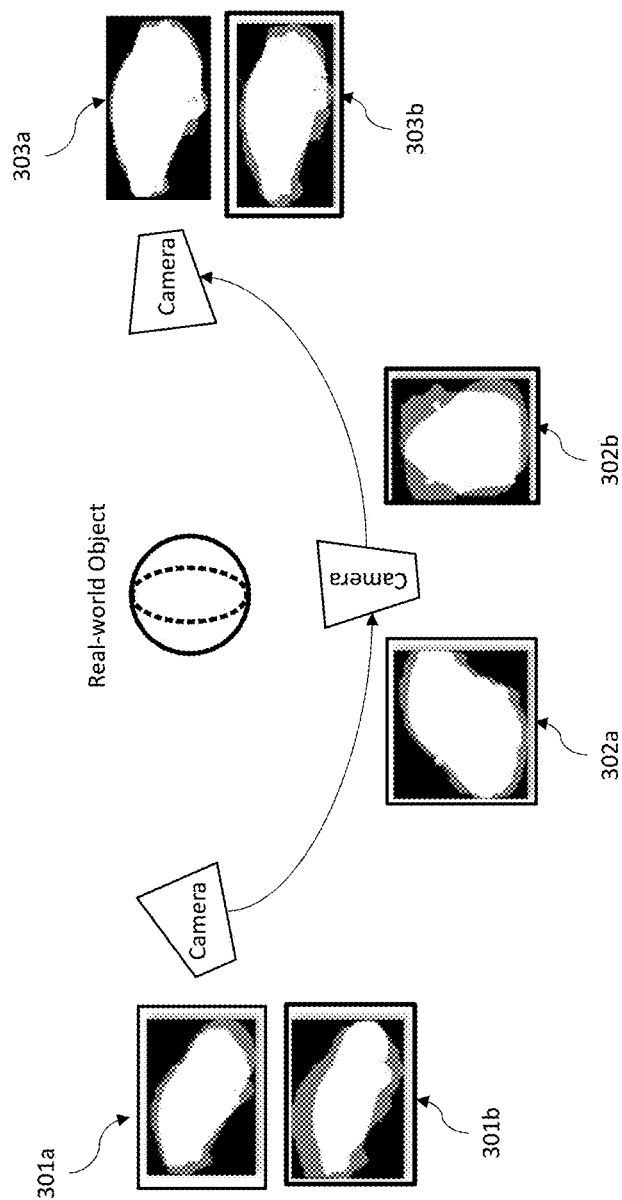
FIG. 3 depicts an illustration of the determination of whether a multi-outline-view of an arranged virtual object matches a multi-outline-view of the real-world object in accordance to one embodiment of the present invention.

To illustrate with an example, referring to FIG. 3, the overlaid images 301*a*, 302*a*, and 303*a* are considered matching, but 301*b*, 302*b*, and 303*b* are considered unmatching. If the average image similarity of all of the unmatched virtual-object 2D outline and real-world-object 2D outline pairs falls below a minimum multi-outline-view similarity threshold ($Th_{MOV}$), the multi-outline-view of arranged virtual object is considered to be not matching the multi-outline-view of the real-world object; otherwise, the multi-outline-view of the arranged virtual object is considered to be matching the multi-outline-view of the real-world object.

If the multi-outline-view of an arranged virtual object is not matching the multi-outline-view of the real-world object, the real-world object pose is to be re-estimated and refined in the real-world object pose estimation (S204) and the real-world object pose estimation refinement by images (S205) processes.

In the embodiment where the motion recorder module 121, the pose estimation module 122, the pose refinement modules 123, and the image similarity calculator 124 are executed by the remote processor 120 separate from the local processor 110 that executes the other execution modules, the estimated (and refined) real-world object pose is transmitted to the local processor 110 for further processing by the rendering module 114.

The rendering module 114 executes the (S208) rendering by arranging the virtual object according to the estimated real-world object pose in the 3D viewing environment, and superimposing the arranged virtual object onto the real-world object in each of the images of the surrounding real-world scene as captured by the camera.

Figure 4A:
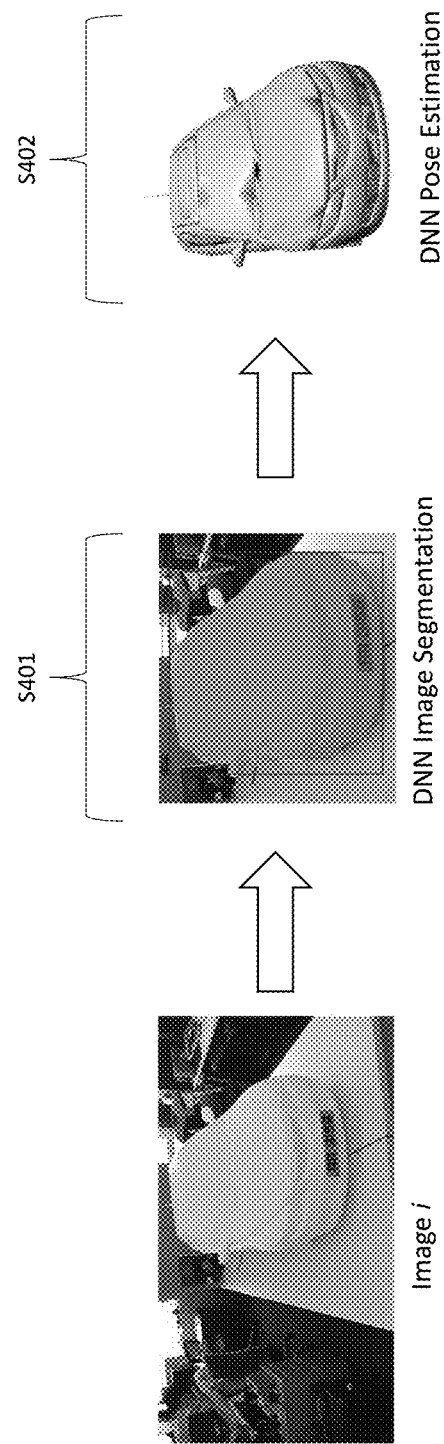
FIG. 4A depicts an illustration of a deep neural network (DNN)-based image segmentation and a DNN-based pose estimation used in estimation of a real-world object pose from a captured image of the surrounding real-world scene by the electronic 3D viewing environment in accordance to one embodiment of the present invention.
Figure 4B:
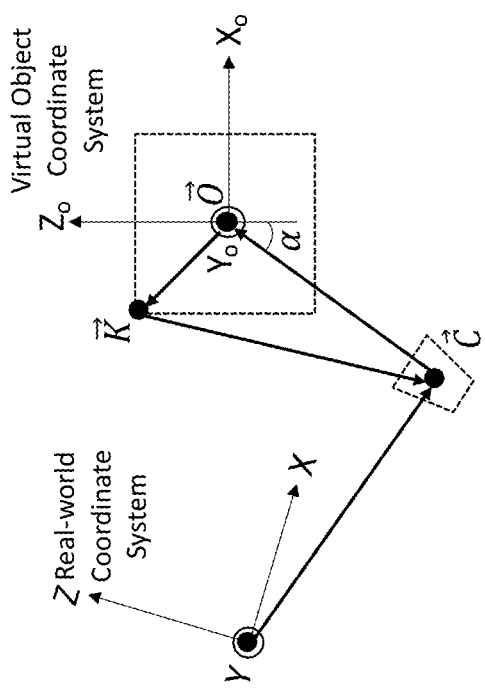
FIG. 4B depicts an illustration of real-world location coordinate system and a virtual location coordinate system as used in the estimation of a real-world object pose from a captured image by the electronic 3D viewing environment in accordance to one embodiment of the present invention.

Referring to FIGS. 4A and 4B for the following description. In accordance to one embodiment, the estimation of the real-world object pose from a captured image i of the surrounding real-world scene containing the real-world object comprising: (S401) segmenting the image region (patch) containing the real-world object by a deep neural network (DNN)-based image segmentation; then (S402) inferring a relative real-world object orientation relative to the camera real-world orientation ($\theta_{c_i}(\theta_{x_i}, \theta_{y_i}, \theta_{z_i})$) by DNN-based pose estimation. The relative real-world object orientation comprises a relative real-world object azimuth ($\alpha$), a relative real-world object elevation, and a relative real-world object in-plane rotation.

After the inference of the relative real-world object orientation, the estimation of the real-world object pose proceeds to obtaining a real-world landmark-to-camera vector ($\overrightarrow{KC}$) from the real-world location coordinate of the real-world landmark ($\vec{K}(X_k, Y_k, Z_k)$) to the camera real-world location coordinate ($\vec{C}(X_i, Y_i, Z_i)$). The real-world landmark-to-camera vector ($\overrightarrow{KC}$) can be expressed as:

$$\overrightarrow{KC} = \vec{C} - \vec{K} = [X_i - X_k, Y_i - Y_k, Z_i - Z_k].$$

The estimation of the real-world object pose further comprises estimating a real-world object-to-landmark vector ($\overrightarrow{OK}$) from the real-world object real-world location coordinate ($\vec{O}$) to the real-world location coordinate of the real-world landmark ($\vec{K}$) by computing a vector arithmetic result of the camera real-world orientation ($\theta_{c_j}(\theta_{x_j}, \theta_{y_j}, \theta_{z_j})$), the estimated relative real-world object orientation, the virtual location coordinate of the corresponding virtual landmark ($\overrightarrow{K_{O_k}}(X_{O_k}, Y_{O_k}, Z_{O_k})$), and a configurable object scaling ratio ($\lambda$) between the real-world object and the virtual object. The vector arithmetic computation can be expressed as:

$$\overrightarrow{OK} = \lambda[X_{O_k}\, Y_{O_k}\, Z_{O_k}] \begin{bmatrix} \cos(\vartheta_{y_i}+\alpha) & 0 & \sin(\vartheta_{y_i}+\alpha) \\ 0 & 1 & 0 \\ -\sin(\vartheta_{y_i}+\alpha) & 0 & \cos(\vartheta_{y_i}+\alpha) \end{bmatrix}.$$

With the real-world landmark-to-camera vector ($\overrightarrow{KC}$) and the real-world object-to-landmark vector ($\overrightarrow{OK}$), a real-world camera-to-object vector ($\overrightarrow{CO}$) is estimated by computing a vector arithmetic result of the estimated real-world object-to-landmark vector and the real-world landmark-to-camera vector; and the computation of the real-world camera-to-object vector ($\overrightarrow{CO}$) can be expressed as:

$$\overrightarrow{CO} = \overrightarrow{OK} + \overrightarrow{KC}.$$

The real-world object real-world location coordinate $\vec{O}$ can then be estimated by computing a vector arithmetic result of the camera real-world location coordinate and the estimated real-world camera-to-object vector; and the computation of the real-world object real-world location coordinate $\vec{O}$ can be expressed as:

$$\vec{O} = \vec{C} + \overrightarrow{CO}.$$

Lastly, the real-world object real-world orientation $\theta_o(\theta_o, \theta_o, \theta_o)$ is estimated by rotating the camera real-world orientation $\theta_{c_i}(\theta_{x_i}, \theta_{y_i}, \theta_{z_i})$ by the relative real-world object orientation; for example: $\theta_{y_o} = \theta_{y_i} + \alpha$.

In accordance to one embodiment, the real-world object pose estimation refinement by images (S205) comprises selecting N number of recorded motions as the selected motions, each comprising a captured image of the surrounding real-world scene and a camera pose (real-world location coordinate and real-world orientation) ({$\text{Image}_n, \vec{C}_n, \overrightarrow{\theta C}_n$}, where n=1, . . . N). For each of the selected motion, its corresponding reference feature (the real-world location coordinate of the real-world landmark and the virtual location coordinate of the corresponding virtual landmark) ({$\overrightarrow{K_n}$, $\overrightarrow{K_{O_n}}$}, where n=1, . . . N) is also obtained by the recognition executed by the reference feature capture module 112 according to the method step S202 as described above. Also, the corresponding relative real-world object azimuth ({$\alpha_{j_n}$}, where n=1, N) is inferred by the DNN-based pose estimation in the real-world object pose estimation (S204). DNN-based image segmentation is applied on each captured image to extract a real-world-object sub image mask ($\{S_n\}$, where n=1, ... N) of the real-world object contained in the captured image.

For each selected motion n, the pose refinement by images module 123A simulates a virtual camera view of the virtual object under the virtual location coordinate system. First, the virtual object is set to locate at the origin (0, 0, 0) under the virtual location coordinate system. Then, using the camera intrinsic properties of the optical sensor 103, of which the intrinsic property matrix can be expressed as:

$$\begin{bmatrix} f_x & 0 & c_x \\ 0 & f_y & c_y \\ 0 & 0 & 1 \end{bmatrix},$$

and the focal length F of optical sensor 103 obtained by calibration, the virtual camera is configured as such that its focal length equals to that of the optical sensor 103; its sensor width $S_x$ as:

$$S_x = f_x/F;$$

its sensor height $S_y$ as:

$$S_y = f_y/F;$$

its principal point as ($c_x$, $c_y$).

The virtual camera is then placed under the virtual location coordinate system in the simulated virtual camera view according to a scaled real-world camera-to-object vector ($\{\lambda \overrightarrow{CO_n}\}$, where n=1, ... N, and $\lambda$ is the object scaling ratio between the real-world object and the virtual object) and an optimized relative real-world object azimuth ($\{\alpha_{j_n}\}$, where n=1, ... N) for the image ($\{Image_n\}$, where n=1, ... N) in each selected motion n.

With the selected motions, the corresponding reference features, and the inferred relative real-world object azimuths, the pose refinement by images module 123A computes the real-world camera-to-object vector ($\{\overrightarrow{CO_n}\}$, where n=1, ... N) for the image ($\{Image_n\}$, where n=1, ... N) in each selected motion n using the same method steps in the real-world object pose estimation (S204) process, except for that the vector arithmetic computation to obtain the real-world object-to-landmark vector ($\{\overrightarrow{OK}\}$, where n=1, ... N) for the selected motion n is altered and based on an optimized relative real-world object azimuth ($\{\alpha_{j_n}\}$ where n=1, ... N) for the selected motion n.

The altered vector arithmetic computation of the real-world object-to-landmark vector for the selected motion n ($\overrightarrow{OK_n}$, where n=1, ... N) can be expressed as:

$$\overrightarrow{OK_n} = \lambda \begin{bmatrix} X_{O_{k_n}} & Y_{O_{k_n}} & Z_{O_{k_n}} \end{bmatrix} \begin{bmatrix} \cos(\vartheta_{y_{i_n}} + \alpha_{j_n}) & 0 & \sin(\vartheta_{y_{i_n}} + \alpha_{j_n}) \\ 0 & 1 & 0 \\ -\sin(\vartheta_{y_{i_n}} + \alpha_{j_n}) & 0 & \cos(\vartheta_{y_{i_n}} + \alpha_{j_n}) \end{bmatrix};$$

and $$\alpha_{j_n} = \alpha_n + j*\delta_a;$$

where n=1, ... N. The optimized relative real-world object azimuth for the selected motion m ($\{\alpha_{j_n}\}$, where n=1, ... N) is a sum of the corresponding relative real-world object azimuth for the selected motion n ($\{\alpha_n\}$, where n=1, ... N) as inferred by the DNN-based pose estimation, and an optimization factor $j*\delta_\alpha$. The virtual camera is also rotated in relative to the virtual object in the simulated virtual camera view for the selected motion n by the optimized relative real-world object azimuth $\alpha_{j_n}$ for the selected motion n.

For each of the selected motions, DNN-based image segmentation is applied on each virtual camera view simulated for the selected motion n to extract a virtual-object sub image mask ($\{V_n\}$, where n=1, ... N) of the virtual object. The pose refinement by images module 123A then computes a mean squared error MSE($\sigma_n$) between the real-world-object sub image mask $S_n$ and virtual-object sub image mask $V_n$. Lastly, the pose refinement by images module 123A finds the optimization factor $j*\delta_\alpha$ such that the average mean squared error $\overline{\sigma}$ of all of the selected motions, that is $$\overline{\sigma} = \frac{1}{N}\sum_{n=1}^{N}\sigma_n,$$

is at its minimum. The run-time estimated real-world object pose is refined by applying the optimization factor $j*\delta_\alpha$ to the relative real-world object azimuth obtained in the real-world object pose estimation (S204).

In short, while the real-world object pose estimation (S204) finds a coarsely-estimated real-world object pose, the real-world object pose estimation refinement by images (S205) refines the coarsely-estimated real-world object pose to a more accurately-estimated real-world object pose.

In accordance to one embodiment, the real-world object pose estimation refinement by features (S206) comprises obtaining N−1 number of consecutive motions in the stream of live motions after the motion for which the real-world object pose estimation (S204) and the real-world object pose estimation refinement by images (S205) are last executed on and prior to the current ($N^{th}$) motion as the selected motions. Each of the selected motions comprises a captured image of the surrounding real-world scene and a camera pose (real-world location coordinate and real-world orientation) ($\{Image_i, \overrightarrow{C_1}, \theta_{c_i}\}$, where i=1, ... N−1). M−1 number of reference features are then selected from the recorded reference features, each comprising a real-world location coordinate of a real-world landmark and a virtual location coordinate of a corresponding virtual landmark ($\{\overrightarrow{K_m}, \overrightarrow{K_{0_m}}\}$, where m=1, ... M−1).

Each of the M−1 number of reference features is selected due to it being different (or changed) from the reference feature corresponding to the previous motion in the stream of live motions.

To illustrate by example with reference to FIG. 5. N−1 number of consecutive motions are selected, along with M−1 number of reference features are selected for the real-world object pose estimation refinement by features.

With the N−1 number of selected motions and the corresponding M−1 number of selected reference features, an altered vector arithmetic computation is used to obtain the real-world object-to-landmark vector ($\{\overrightarrow{O_iK_m}\}$, where i=1, ... N−1; m=1, ... M−1) for the selected motion i, which is based on an optimized relative real-world object azimuth ($\{\alpha_j\}$, where i=1, ... N−1) for the selected motion i.

The altered vector arithmetic computation of the real-world object-to-landmark vector for the selected motion i($\{\overrightarrow{O_iK_m}\}$, where i=1, ... N−1; m=, ... M−1) can be expressed as:

$$\overrightarrow{O_iK_m} = \lambda \begin{bmatrix} X_{O_{k_m}} & Y_{O_{k_m}} & Z_{O_{k_m}} \end{bmatrix} \begin{bmatrix} \cos(\vartheta_{y_i} + \alpha_j) & 0 & \sin(\vartheta_{y_i} + \alpha_j) \\ 0 & 1 & 0 \\ -\sin(\vartheta_{y_i} + \alpha_j) & 0 & \cos(\vartheta_{y_i} + \alpha_j) \end{bmatrix};$$

and $$\alpha_j = \alpha + j*\delta_a;$$

where i=1, ... N−1; m=1, ... M−1. The optimized relative real-world object azimuth $\alpha_j$ is a sum of the relative real-world object azimuth $\alpha$ as obtained in the real-world object pose estimation (S204) and the real-world object pose estimation refinement by images (S205) last executed, and an optimization factor $j*\delta_\alpha$. Lastly, the pose refinement by features module 123B finds the optimization factor $j*\delta_\alpha$, that minimizes the standard deviations of the estimated real-world object real-world location coordinates $\overrightarrow{O_{I_m}}$ (obtained based on the same calculation steps as in the real-world object pose estimation (S204) process using the optimized relative real-world object azimuth $\alpha_j$) for the selected motions that correspond to the M−1 number of selected reference features.

The run-time estimated real-world object pose (for the current motion) is refined by applying the optimization factor $j*\delta_\alpha$ to the relative real-world object azimuth obtained in the last obtained in the last real-world object pose estimation (S204) and the real-world object pose estimation refinement by images (S205) executed.

The embodiments disclosed herein may be implemented using one or more computing devices, computer processors, or electronic circuitries including but not limited to application specific integrated circuits (ASIC), field programmable gate arrays (FPGA), and other programmable logic devices specially configured or programmed according to the teachings of the present disclosure. Machine instructions executing in and/or electronic circuitry configurations in the computing devices, computer processors, or programmable logic devices can readily be prepared by practitioners skilled in the computer and electronic art based on the teachings of the present disclosure.

The aforesaid computing devices, computer processors, or electronic circuitries may be incorporated in one or more server computers, personal computers, laptop computers, mobile computing devices such as smartphones and tablet computers.

The electronic embodiments include transient and non-transient electronic storage media having machine instructions and/or electronic circuitry configuration data stored therein which can be used to configured computing devices, computer processors, or electronic circuitries to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A method for aligning and overlaying a virtual object onto a real-world object in an electronic three-dimensional (3D) viewing environment, comprising:
   receiving a motion in a stream of live motions, the motion comprising:
      an image of a surrounding real-world scene containing the real-world object captured by a camera of the electronic 3D viewing environment; and
      a camera real-world pose determined by a position and orientation tracking module, the camera real-world pose comprising:
         a camera real-world location coordinate of the camera; and
         a camera real-world orientation of the camera lens;
   recognizing, by a reference feature capture module, a reference feature for aligning the virtual object to the real-world object, wherein the reference feature comprises:
      a real-world location coordinate of a real-world landmark on the real-world object in the image; and
      a virtual location coordinate of a corresponding virtual landmark on the virtual object;
   recording, by a motion recorder module, the motion if the motion changes from a last recorded motion;
   recording, by the motion recorder module, the reference feature if the reference feature changes from a last recorded reference feature;
   estimating, by a pose estimation module, a real-world object pose, wherein the real-world object pose comprises a real-world object real-world location coordinate of the real-world object of the motion and a real-world object real-world orientation of the real-world object of the motion;
   refining, by a pose refinement by images module, the real-world object pose estimation;
   refining, by a pose refinement by features module, the real-world object pose estimation;
   determining, by an image similarity calculator, whether a multi-outline-view of arranged virtual object matches a multi-outline-view of the real-world object;
   arranging and rendering, by a rendering module, the virtual object according to the estimated and refined real-world object pose in the 3D viewing environment;

wherein after each execution of the real-world object pose estimation by the pose estimation module and the real-world object pose estimation refinement by the pose refinement by images module, the real-world object pose estimation is refined only by the pose refinement by features module for each of subsequent motions in the stream of live motions until the multi-outline-view of an arranged virtual object is no longer matching the multi-outline-view of the real-world object; and wherein if the image similarity calculator determines that the multi-outline-view of an arranged virtual object is not matching the multi-outline-view of the real-world object, re-estimating the real-world object pose by executing the real-world object pose estimation by the pose estimation module and the real-world object pose estimation refinement by the pose refinement by images module.

2. The method of claim 1, wherein the estimation of real-world object pose comprising:

segmenting the image region containing the real-world object by deep neural network (DNN)-based image segmentation;

inferring a relative real-world object orientation relative to the camera real-world orientation by DNN-based pose estimation, wherein the relative real-world object orientation comprises a relative real-world object azimuth, a relative real-world object elevation, and a relative real-world object in-plane rotation;

obtaining a real-world landmark-to-camera vector from the real-world location coordinate of the real-world landmark to the camera real-world location coordinate;

estimating a real-world object-to-landmark vector from the real-world object real-world location coordinate to the real-world location coordinate of the real-world landmark by computing a vector arithmetic result of the camera real-world orientation, the relative real-world object orientation, the virtual location coordinate of the corresponding virtual landmark, and an object scaling ratio between the real-world object and the virtual object;

estimating a real-world camera-to-object vector by computing a vector sum of the estimated real-world object-to-landmark vector and the real-world landmark-to-camera vector;

estimating the real-world object real-world location coordinate by computing a vector sum of the camera real-world location coordinate and the estimated real-world camera-to-object vector; and estimating the real-world object real-world orientation by rotating the camera real-world orientation by the relative real-world object orientation.

3. The method of claim 1, wherein the real-world object pose estimation refinement by features comprises:

selecting N−1 number of motions in the stream of live motions after the motion for which the real-world object pose estimation and the real-world object pose estimation refinement by the pose refinement by images module are last executed on as selected motions, each of the selected motions comprising:
  a captured image of the surrounding real-world scene for the selected motion; and
  a camera pose comprising a camera real-world location coordinate and a camera real-world orientation for the selected motion;

selecting M−1 number of reference features from the recorded reference features, each of the selected reference features comprising:
  a real-world location coordinate of a real-world landmark corresponding to one or more of the selected motions; and
  a virtual location coordinate of a corresponding virtual landmark;

estimating a real-world object-to-landmark vector for the selected motion for each of the selected motions by using an altered vector arithmetic computation based on an optimized relative real-world object azimuth, the virtual location coordinate of the corresponding virtual landmark, and an object scaling ratio between the real-world object and the virtual object, wherein the optimized relative real-world object azimuth is a sum of a relative real-world object azimuth obtained in the real-world object pose estimation and the real-world object pose estimation refinement by the pose refinement by images module last executed and an optimization factor;

estimating a real-world object real-world location coordinate for the selected motion using the estimated real-world object-to-landmark vector based on the optimized relative real-world object azimuth;

finding the optimization factor that minimizes standard deviations of all of the estimated real-world object real-world location coordinates for all of the selected motions; and applying the optimization factor to the relative real-world object azimuth in the estimated and refined real-world object pose during run-time.

4. The method of claim 1, wherein the real-world object pose estimation refinement by images comprising:

selecting M number of recorded motions as selected motions, each selected motion comprising a captured image of the surrounding real-world scene for the selected motion and a camera pose comprising a camera real-world location coordinate and a camera real-world orientation for the selected motion;

segmenting the captured image region containing the real-world object by DNN-based image segmentation;

estimating a real-world object-to-landmark vector for the selected motion from the real-world object real-world location coordinate for the selected motion to the real-world location coordinate of the real-world landmark for the selected motion by computing a vector arithmetic result of the camera real-world orientation for the selected motion, an optimized relative real-world object azimuth for the selected motion, the virtual location coordinate of the corresponding virtual landmark for the selected motion, and an object scaling ratio between the real-world object and the virtual object;

estimating a real-world camera-to-object vector for the selected motion by computing a vector sum of the estimated real-world object-to-landmark vector for the selected motion and the real-world landmark-to-camera vector for the selected motion;

simulating a virtual camera view of the virtual object for the selected motion comprising:
  setting the virtual object virtual location coordinate to origin;

configuring the virtual camera according to camera intrinsic properties and calibrated focal length of the camera of the electronic 3D viewing environment;

placing the virtual camera according to the real-world camera-to-object vector for the selected motion scaled by an object scaling ratio between the real-world object and the virtual object; and rotating the virtual camera according to the optimized relative real-world object azimuth for the selected motion;

extracting a real-world-object sub image mask of the real-world object contained in the captured image for the selected motion by DNN-based image segmentation; and extracting a virtual-object sub image mask of the virtual object in the simulated virtual camera view for the selected motion by DNN-based image segmentation;

wherein the optimized relative real-world object azimuth for the selected motion is a sum of the inferred relative real-world object azimuth for the selected motion and an optimization factor;

finding the optimization factor values such that an average mean squared error between the real-world-object sub image mask and its corresponding virtual-object sub image mask pairs for all of the selected motions is at its minimum; and applying the optimization factor to the relative real-world object azimuth in the estimation real-world object pose during run-time.

5. The method of claim 1,
wherein the camera real-world location coordinate and the camera real-world orientation are computed by the position and orientation tracking module using signal data received from one or more motion sensors of the electronic 3D viewing environment; and wherein the signal data comprises one or more of Global Positional System (GPS) signal data, wireless triangulation of wireless communication signals, data from sensor fusion algorithms of the camera and a motion sensor, and visual-inertial odometry signal data.

6. The method of claim 1, wherein the recognition of the reference feature comprising:
detecting the real-world landmark using an object detector, scanning for a visual marker, or using a user interface for a human user to indicate the real-world landmark on the real-world object in the image;
determining an image location coordinate of the detected real-world landmark;
computing, by a spatial mapping or depth estimation module, the real-world location coordinate of the real-world landmark of the real-world landmark from the image location coordinate of the real-world landmark; and
obtaining the virtual location coordinate of the corresponding virtual landmark on the virtual object.

7. The method of claim 1, wherein the determination of whether a multi-outline-view of an arranged virtual object matches a multi-outline-view of the real-world object comprises:
generating a virtual-object two-dimensional (2D) outline of the virtual object arranged according to the real-world object pose computed for each of one or more motions selected from the recorded motions;

recognizing a the real-world-object 2D outline of the real-world object in the image in each of the selected recorded motions;

overlaying each of the virtual-object 2D outlines on top of its corresponding real-world-object 2D outline of each of the selected motions for matching the virtual-object 2D outlines with the real-world-object 2D outlines; and if an average image similarity of all of the unmatched virtual-object 2D outline and real-world-object 2D outline pairs falls below a minimum multi-outline-view similarity threshold, the multi-outline-view of arranged virtual object is considered to be not matching the multi-outline-view of the real-world object, else the multi-outline-view of the arranged virtual object is considered to be matching the multi-outline-view of the real-world object.

8. The method of claim 1, wherein the virtual object comprises one or more of a user manual, a notice, a sign, and a logo.

9. The method of claim 1,
wherein the position and orientation tracking module, the reference feature capture module, the spatial mapping or depth estimation module, and the rendering module are executed by a local processor; and wherein the motion recorder module, the pose estimation module, the pose refinement by images module, the pose refinement by features module, and the image similarity calculator are executed by a remote processor.

10. An apparatus for processing a stream of live motions, aligning and overlaying a virtual object onto a real-world object in an electronic three-dimensional (3D) viewing environment, each motion in stream of live motions comprising an of a surrounding real-world scene and a camera real-world pose, the apparatus comprising:
a camera configured to capture the image of the surrounding real-world scene containing the real-world object;
a position and orientation tracking module configured to determine the camera real-world pose, the camera real-world pose comprising:
a camera real-world location coordinate of the camera; and
a camera real-world orientation of the camera lens;
a reference feature capture module configured to recognize a reference feature for aligning the virtual object to the real-world object, wherein the reference feature comprises:
a real-world location coordinate of a real-world landmark on the real-world object in the image; and
a virtual location coordinate of a corresponding virtual landmark on the virtual object;
a motion recorder module configured to:
record the motion if the motion changes from a last recorded motion; and
record the reference feature if the reference feature changes from a last recorded reference feature;
a pose estimation module configured to estimate a real-world object pose, wherein the real-world object pose comprises a real-world object real-world location coordinate of the real-world object of the motion and a real-world object real-world orientation of the real-world object of the motion;
a pose refinement by images module configured to refine the real-world object pose estimation;
a pose refinement by features module configured to refine the real-world object pose estimation;

an image similarity calculator configured to determine whether a multi-outline-view of arranged virtual object matches a multi-outline-view of the real-world object;

a rendering module configured to arrange and render the virtual object according to the estimated and refined real-world object pose in the 3D viewing environment;

wherein after each execution of the real-world object pose estimation by the pose estimation module and the real-world object pose estimation refinement by the pose refinement by images module, the real-world object pose estimation is refined only by the pose refinement by features module for each of subsequent motions in the stream of live motions until the multi-outline-view of an arranged virtual object is no longer matching the multi-outline-view of the real-world object; and wherein if the image similarity calculator determines that the multi-outline-view of an arranged virtual object is not matching the multi-outline-view of the real-world object, re-estimating the real-world object pose by executing the real-world object pose estimation by the pose estimation module and the real-world object pose estimation refinement by the pose refinement by images module.

11. The apparatus of claim 10, wherein the estimation of real-world object pose comprising:

segmenting the image region containing the real-world object by deep neural network (DNN)-based image segmentation;

inferring a relative real-world object orientation relative to the camera real-world orientation by DNN-based pose estimation, wherein the relative real-world object orientation comprises a relative real-world object azimuth, a relative real-world object elevation, and a relative real-world object in-plane rotation;

obtaining a real-world landmark-to-camera vector from the real-world location coordinate of the real-world landmark to the camera real-world location coordinate;

estimating a real-world object-to-landmark vector from the real-world object real-world location coordinate to the real-world location coordinate of the real-world landmark by computing a vector arithmetic result of the camera real-world orientation, the relative real-world object orientation, the virtual location coordinate of the corresponding virtual landmark, and an object scaling ratio between the real-world object and the virtual object;

estimating a real-world camera-to-object vector by computing a vector sum of the estimated real-world object-to-landmark vector and the real-world landmark-to-camera vector;

estimating the real-world object real-world location coordinate by computing a vector sum of the camera real-world location coordinate and the estimated real-world camera-to-object vector; and estimating the real-world object real-world orientation by rotating the camera real-world orientation by the relative real-world object orientation.

12. The apparatus of claim 10, wherein the real-world object pose estimation refinement by the pose estimation refinement by features module comprises:

selecting N−1 number of motions in the stream of live motions after the motion for which the real-world object pose estimation and the real-world object pose estimation refinement by the pose refinement by images module are last executed on as selected motions, each of the selected motions comprising:

a captured image of the surrounding real-world scene for the selected motion; and a camera pose comprising a camera real-world location coordinate and a camera real-world orientation for the selected motion;

selecting M−1 number of reference features from the recorded reference features, each of the selected reference features comprising:

a real-world location coordinate of a real-world landmark corresponding to one or more of the selected motions; and a virtual location coordinate of a corresponding virtual landmark;

estimating a real-world object-to-landmark vector for the selected motion for each of the selected motions by using an altered vector arithmetic computation based on an optimized relative real-world object azimuth, the virtual location coordinate of the corresponding virtual landmark, and an object scaling ratio between the real-world object and the virtual object, wherein the optimized relative real-world object azimuth is a sum of a relative real-world object azimuth obtained in the real-world object pose estimation and the real-world object pose estimation refinement by the pose refinement by images module last executed and an optimization factor;

estimating a real-world object real-world location coordinate for the selected motion using the estimated real-world object-to-landmark vector based on the optimized relative real-world object azimuth;

finding the optimization factor that minimizes standard deviations of all of the estimated real-world object real-world location coordinates for all of the selected motions; and applying the optimization factor to the relative real-world object azimuth in the estimated and refined real-world object pose during run-time.

13. The apparatus of claim 10, wherein the real-world object pose estimation refinement by the pose estimation refinement by images module comprising:

selecting M number of recorded motions as selected motions, each selected motion comprising a captured image of the surrounding real-world scene for the selected motion and a camera pose comprising a camera real-world location coordinate and a camera real-world orientation for the selected motion;

segmenting the captured image region containing the real-world object by DNN-based image segmentation;

estimating a real-world object-to-landmark vector for the selected motion from the real-world object real-world location coordinate for the selected motion to the real-world location coordinate of the real-world landmark for the selected motion by computing a vector arithmetic result of the camera real-world orientation for the selected motion, an optimized relative real-world object azimuth for the selected motion, the virtual location coordinate of the corresponding virtual landmark for the selected motion, and an object scaling ratio between the real-world object and the virtual object;

estimating a real-world camera-to-object vector for the selected motion by computing a vector sum of the estimated real-world object-to-landmark vector for the selected motion and the real-world landmark-to-camera vector for the selected motion;

simulating a virtual camera view of the virtual object for the selected motion comprising:
setting the virtual object virtual location coordinate to origin;
configuring the virtual camera according to camera intrinsic properties and calibrated focal length of the camera of the electronic 3D viewing environment;
placing the virtual camera according to the real-world camera-to-object vector for the selected motion scaled by an object scaling ratio between the real-world object and the virtual object; and
rotating the virtual camera according to the optimized relative real-world object azimuth for the selected motion;
extracting a real-world-object sub image mask of the real-world object contained in the captured image for the selected motion by DNN-based image segmentation; and
extracting a virtual-object sub image mask of the virtual object in the simulated virtual camera view for the selected motion by DNN-based image segmentation;
wherein the optimized relative real-world object azimuth for the selected motion is a sum of the inferred relative real-world object azimuth for the selected motion and an optimization factor;
finding the optimization factor values such that an average mean squared error between the real-world-object sub image mask and its corresponding virtual-object sub image mask pairs for all of the selected motions is at its minimum; and
applying the optimization factor to the relative real-world object azimuth in the estimation real-world object pose during run-time.

14. The apparatus of claim 10,
wherein the camera real-world location coordinate and the camera real-world orientation are computed by the position and orientation tracking module using signal data received from one or more motion sensors of the electronic 3D viewing environment; and
wherein the signal data comprises one or more of Global Positional System (GPS) signal data, wireless triangulation of wireless communication signals, data from sensor fusion algorithms of the camera and a motion sensor, and visual-inertial odometry signal data.

15. The apparatus of claim 10, wherein the recognition of the reference feature by the reference feature capture module comprising:
detecting the real-world landmark using an object detector, scanning for a visual marker, or using a user interface for a human user to indicate the real-world landmark on the real-world object in the image;
determining an image location coordinate of the detected real-world landmark;
computing, by a spatial mapping or depth estimation module, the real-world location coordinate of the real-world landmark of the real-world landmark from the image location coordinate of the real-world landmark; and
obtaining the virtual location coordinate of the corresponding virtual landmark on the virtual object.

16. The apparatus of claim 10, wherein the determination of whether a multi-outline-view of an arranged virtual object matches a multi-outline-view of the real-world object comprises:
generating a virtual-object two-dimensional (2D) outline of the virtual object arranged according to the real-world object pose computed for each of one or more motions selected from the recorded motions;
recognizing a the real-world-object 2D outline of the real-world object in the image in each of the selected recorded motions;
overlaying each of the virtual-object 2D outlines on top of its corresponding real-world-object 2D outline of each of the selected motions for matching the virtual-object 2D outlines with the real-world-object 2D outlines; and
if an average image similarity of all of the unmatched virtual-object 2D outline and real-world-object 2D outline pairs falls below a minimum multi-outline-view similarity threshold, the multi-outline-view of arranged virtual object is considered to be not matching the multi-outline-view of the real-world object,
else the multi-outline-view of the arranged virtual object is considered to be matching the multi-outline-view of the real-world object.

17. The apparatus of claim 10, wherein the virtual object comprises one or more of a user manual, a notice, a sign, and a logo.

18. The apparatus of claim 10,
wherein the position and orientation tracking module, the reference feature capture module, the spatial mapping or depth estimation module, and the rendering module are executed by a local processor; and
wherein the motion recorder module, the pose estimation module, the pose refinement by images module, the pose refinement by features module, and the image similarity calculator are executed by a remote processor.

* * * * *